United States Patent
Squire et al.

(10) Patent No.: US 9,205,785 B2
(45) Date of Patent: Dec. 8, 2015

(54) VEHICLE CAMERA MOUNTING ASSEMBLY

(71) Applicants: Michael J Squire, Burton, MI (US); Jack B Staley, Lake Orion, MI (US); William G Yadon, Troy, MI (US); Daniel T Bullion, Milford, MI (US)

(72) Inventors: Michael J Squire, Burton, MI (US); Jack B Staley, Lake Orion, MI (US); William G Yadon, Troy, MI (US); Daniel T Bullion, Milford, MI (US)

(73) Assignee: FCA US LLC, Auburn Hills, MI (US)

( * ) Notice: Subject to any disclaimer, the term of this patent is extended or adjusted under 35 U.S.C. 154(b) by 281 days.

(21) Appl. No.: 13/709,868

(22) Filed: Dec. 10, 2012

(65) Prior Publication Data

US 2014/0158731 A1 Jun. 12, 2014

(51) Int. Cl.
*B60R 11/04* (2006.01)

(52) U.S. Cl.
CPC ...................................... *B60R 11/04* (2013.01)

(58) Field of Classification Search
CPC .............. B60R 11/04; B60R 2011/004; B60R 2011/0045; B60R 2011/0047
USPC ......... 224/488, 489, 517, 537, 326, 544, 545, 224/547, 557; 396/419; 348/148, 373
See application file for complete search history.

(56) References Cited

U.S. PATENT DOCUMENTS

2009/0122141 A1* 5/2009 Nakamura et al. ............ 348/148

FOREIGN PATENT DOCUMENTS

| EP | 2722234 | * | 4/2014 | |
| JP | 2004306888 A | * | 11/2004 | .............. B60R 11/04 |
| JP | 2006044514 A | * | 2/2006 | |
| JP | 2007261503 A | | 10/2007 | |
| JP | 2012101594 A | * | 5/2012 | |

* cited by examiner

*Primary Examiner* — Brian D Nash
*Assistant Examiner* — Corey Skurdal
(74) *Attorney, Agent, or Firm* — Ralph E. Smith

(57) ABSTRACT

In at least one implementation, a mounting assembly for a vehicle camera to mount the camera to a vehicle panel having inner and outer surfaces and an opening includes a clip and a bezel. The clip is adapted to overlie an inner surface of the panel and has a camera retention feature for connecting the clip to the camera, and the clip is larger than the opening in the panel to inhibit the camera from being removed through the opening. The bezel is adapted to overlie the outer surface of the panel and has a connection feature adapted to connect the bezel with one or both of the clip and the camera to trap a portion of the vehicle panel between the bezel and the clip.

18 Claims, 7 Drawing Sheets

VEHICLE CAMERA MOUNTING ASSEMBLY

FIELD

The present disclosure relates to a vehicle camera mounting assembly.

BACKGROUND

Many automotive vehicles include a camera oriented to provide a view behind a vehicle to aid in operating the vehicle in reverse. Such camera assemblies have been located in rear light assemblies and in plastic vehicle panels/fascia. As such, sockets or mounting brackets can be molded into the light assembly housings or fascia to retain the camera in position. Further, one desirable location for such a camera is in the center of the vehicle, at a height suitable to provide the most useful view of the surroundings behind the vehicle. However, indicia on the vehicle (such as vehicle names, corporate logos and the like), light assemblies, automatic trunk lid opening mechanisms and the like all may be positioned in the center at the rear of the vehicle.

SUMMARY

In at least one implementation, a mounting assembly for a vehicle camera to mount the camera to a vehicle panel having inner and outer surfaces and an opening includes a clip and a bezel. The clip is adapted to overlie an inner surface of the panel and has a camera retention feature for connecting the clip to the camera, and the clip is larger than the opening in the panel to inhibit the camera from being removed through the opening. The bezel is adapted to overlie the outer surface of the panel and has a connection feature adapted to connect the bezel with one or both of the clip and the camera to trap a portion of the vehicle panel between the bezel and the clip. In at least certain implementations, the camera may be securely held against the panel without any fasteners passing through the panel, and/or without the panel having any outwardly (e.g. walls or fingers) or inwardly (e.g. pockets or cavities) projecting features. Other mounting assemblies may utilize fasteners extending through the panel and holding one or both of the bezel and clip to the panel.

In at least some implementations, a mounting assembly for a vehicle camera to mount the camera to a vehicle panel having inner and outer surfaces and an opening includes a bezel and a clip. The bezel has an outer plate adapted to overlie the outer surface of the panel, an opening through the bezel aligned with the opening of the panel and a connection feature adapted to extend from the outer plate through the panel opening to connect with the camera. The connection between the camera and the bezel is on the opposite side of the panel as the outer plate. The clip is adapted to overlie an inner surface of the panel and has a camera retention feature for connecting the clip to the camera. The clip is engaged on one side with the camera and on its other side with the panel. In at least certain implementations, the camera may be securely held against the panel without any fasteners passing through the panel, and/or without the panel having any outwardly (e.g. walls or fingers) or inwardly (e.g. pockets or cavities) projecting features. Other mounting assemblies may utilize fasteners extending through the panel and holding one or both of the bezel and clip to the panel.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
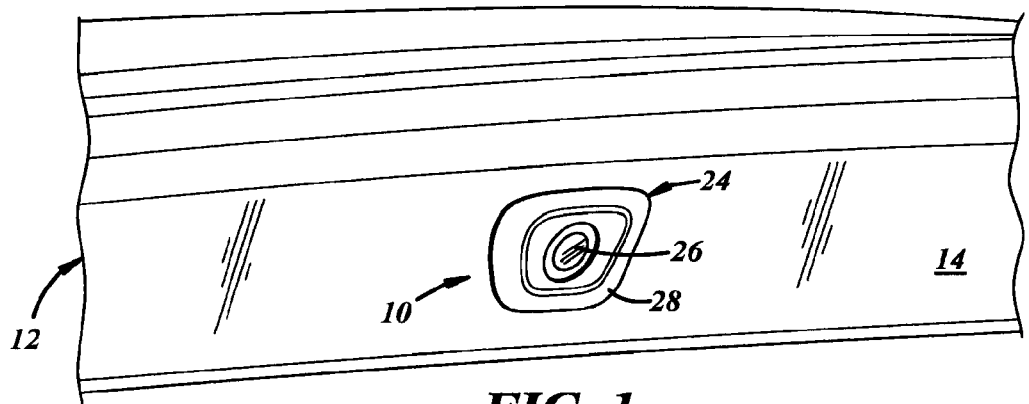
FIG. 1 is a fragmentary front view of a portion of an exterior surface of a vehicle deck lid including a rear-facing camera assembly.

Referring in more detail to the drawings, FIG. 1 illustrates a camera assembly 10 mounted on a portion of a vehicle exterior panel 12 such as a trunk or deck lid. The camera assembly 10 includes a camera 11 and mounting assembly 13 for the camera 11. In the illustrated embodiment, the camera 11 is rearward facing and used to provide a driver of the vehicle a view of the surroundings behind the vehicle when the vehicle is operated in reverse. In the implementation shown, the camera assembly 10 is mounted directly to a sheet metal panel 12 or surface of the vehicle, as opposed to a polymeric surface like a fascia, light housing, bracket for a rear tail light, or the like.

Figure 2:
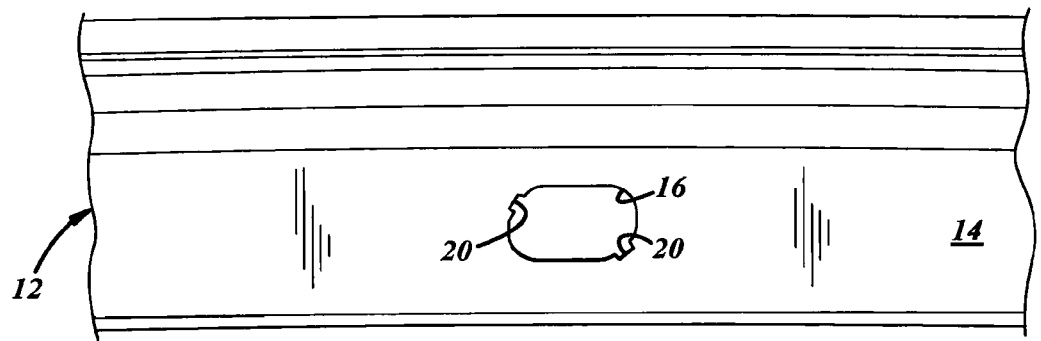
FIG. 2 is a fragmentary view like FIG. 1 with the camera assembly removed from the deck lid.
Figure 3:
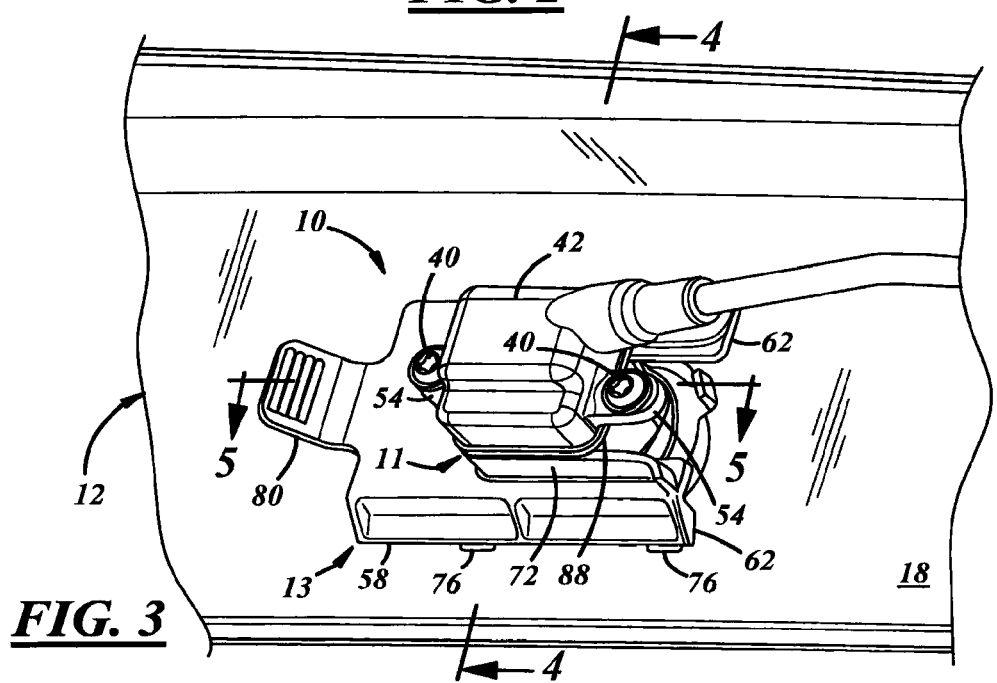
FIG. 3 is a fragmentary perspective view of an inside surface of the deck lid with the camera assembly installed on the deck lid.

As shown in FIGS. 1-3, the deck lid 12 may include a rearwardly facing surface 14 of a vehicle component or panel which may be formed from sheet metal. An opening 16 is provided through the panel (which is the deck lid 12 in this embodiment) for mounting the camera assembly 10, and the deck lid 12 may have an inner surface 18 against which the camera assembly may be held and retained. As shown in FIG. 2, the opening 16 may include one or more alignment features to facilitate proper orientation and alignment of the camera assembly 10 relative to the deck lid 12. In the implementation shown, the alignment features include spaced apart slots or recesses 20 which may act as keyways to receive keys or tabs on a camera assembly 10 that prevent an improper (i.e. flipped over or reversed) orientation of the camera assembly relative to the deck lid 12 and thereby ensures a proper orientation of the camera assembly. While shown as part of a deck lid 12 the panel could be another rearwardly facing vehicle surface or component.

Figure 5:
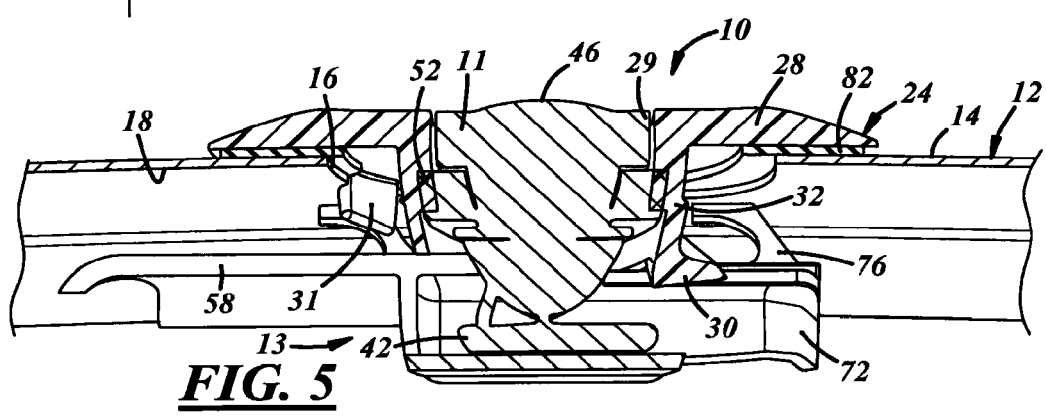
FIG. 5 is a cross-sectional view taken generally along line 5-5 of FIG. 3.
Figure 7:
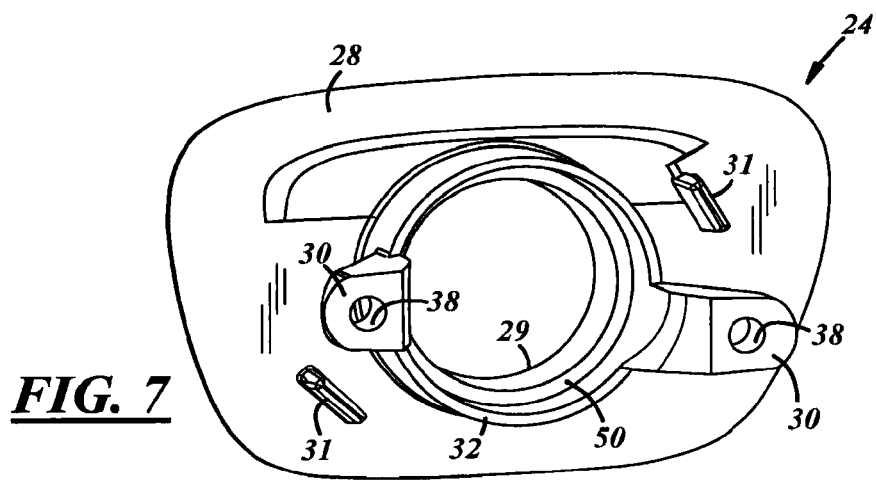
FIG. 7 is a rear perspective view of the bezel.

As shown in FIGS. 1-3, the camera assembly 10 is mounted to the deck lid hereinafter referred to simply as panel 12 through the opening 16. At the outer surface 14 of the panel 12, the camera assembly 10 may include a bezel 24 that may retain a desired position and orientation of a camera lens 26 and provide a decorative or visually appealing surface against the panel 12. In that regard, the bezel 24 may have an outer plate 28 that sits generally flush against and generally parallel to the panel 12 with an opening 29 aligned with the panel opening 16. The outer plate 28 that overlies a portion of the panel 12 surrounding the opening 16 such that the bezel 24 cannot be forced or otherwise passed through the panel opening 16. Mounting tabs 30 may extend rearwardly from the bezel 24 and be arranged for receipt through panel opening 16. To ensure proper orientation of the bezel 24 relative to the panel 12, the bezel may include alignment tabs 31 (FIGS. 5 and 7). The alignment tabs 31 and recesses 20 may be unevenly sized and/or spaced so that the tabs 31 fit through the recesses 20 in only one orientation of the bezel 24 relative to the panel opening 16.

Figure 6:
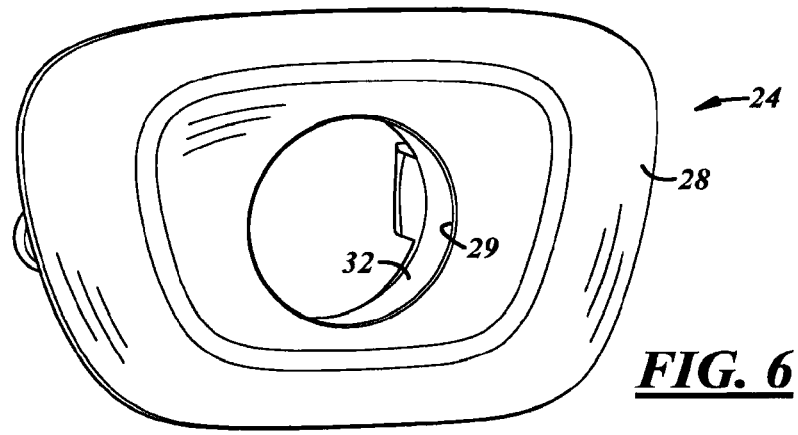
FIG. 6 is a front perspective view of a bezel of the camera assembly.

As best shown in FIGS. 6 and 7, the bezel 24 may include an axially extending wall 32 (e.g. relative to an axis 34 of the opening 16) that defines a cavity 36 extending from the opening 29 and in which a portion of the camera 11 is received. The axial wall 32 may be generally cylindrical, have a length suitable to at least span the thickness of the panel 12 and may include one or more connection features to which the camera 11 may be connected. The wall 32 need not be circumferentially continuous and could simply be one or more fingers or other structures spanning the panel 12 through the opening 16. The connection features as shown include openings 38 through tabs 30 arranged to receive a mechanical fastener such as a screw 40 (FIG. 3) or rivet to directly couple the camera 11 to the bezel 24. In this way, the outer plate 28 may be disposed against the outer surface 14 of the panel 12 while the connection to the camera assembly 10 is adjacent to the inner surface 18 of the panel 12. In at least some implementations, the camera assembly 10 can be retained primarily adjacent to the inner surface 18 of the panel 12 with only the bezel 24 and camera lens 26 visible from the exterior of the panel 12. This facilitates secure attachment of the camera assembly 10 to the panel 12 as will be set forth in more detail later.

Figure 9:
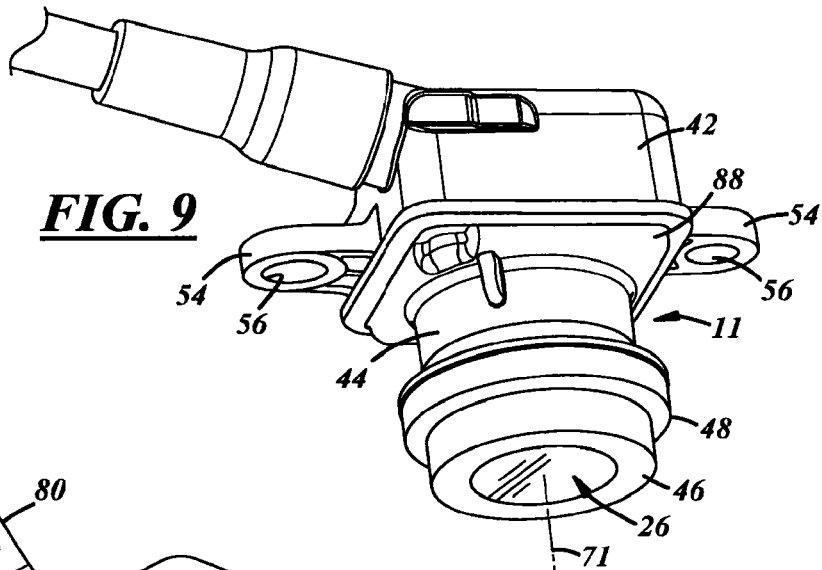
FIG. 9 is a perspective view of a camera housing.

As best shown in FIGS. 3 and 9, the camera assembly 10 may include a housing 42 in which the components of the camera 11 are maintained and preferably sealed from the environment. The housing 42 may include a generally cylindrical and tubular neck portion 44 in which the camera lens 26 is received, and a protective cover 46 carried by the housing 42 may be provided to overlie the lens 26, if desired. The neck 44 may be received within the cavity 36 defined by the bezel wall 32 so that the camera lens 26 is oriented to view through the opening 29 of the bezel 24. A radially outwardly extending flange 48 (FIG. 9) may engage an inwardly extending shoulder 50 (FIG. 7) of the bezel wall 32 in assembly to control the depth of insertion of the camera 11 in the bezel cavity 36. A seal 52 (FIGS. 4 and 5) may be provided between the flange 48 and shoulder 50 to limit or prevent contaminants from passing between the camera 11 and the bezel 24. The housing 42 may include outwardly oriented mounting tabs 54 with openings 56 adapted to align with the openings 38 of the bezel 24 and through which fasteners may be received to securely connect the camera housing 42 to the bezel 24. As best shown in FIG. 3, screws 40 may be used in one implementation, and the screws may be self-tapping within the openings 38 of the bezel 24, if desired. Of course, many other fasteners may be used, and these components could also be adhered, welded, crimped, clamped or otherwise connected together.

Figure 10:
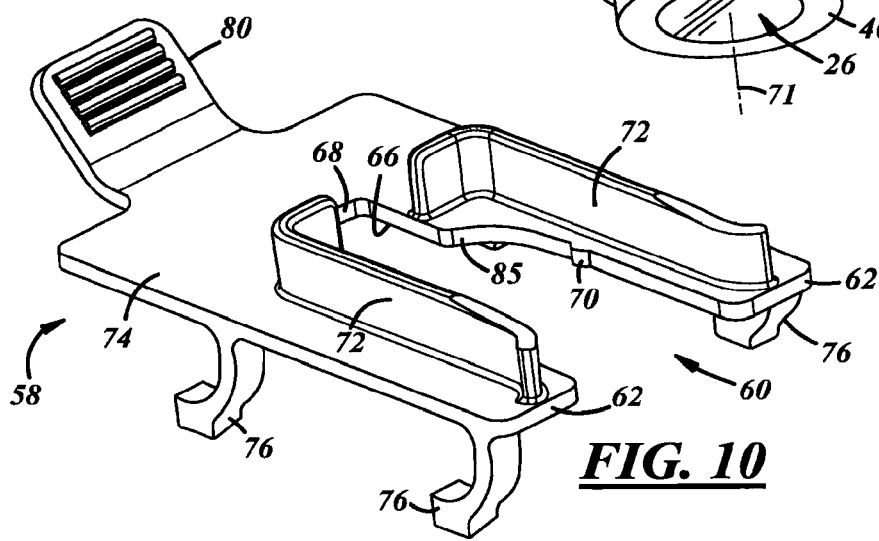
FIG. 10 is a front perspective view of a mounting bracket for the camera assembly.
Figure 11:
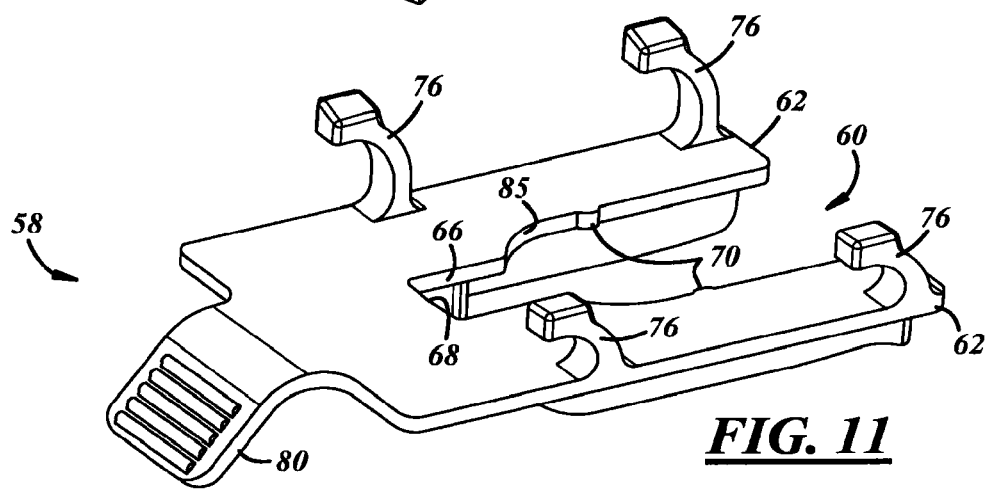
FIG. 11 is a rear perspective view of the mounting bracket.
Figure 12:
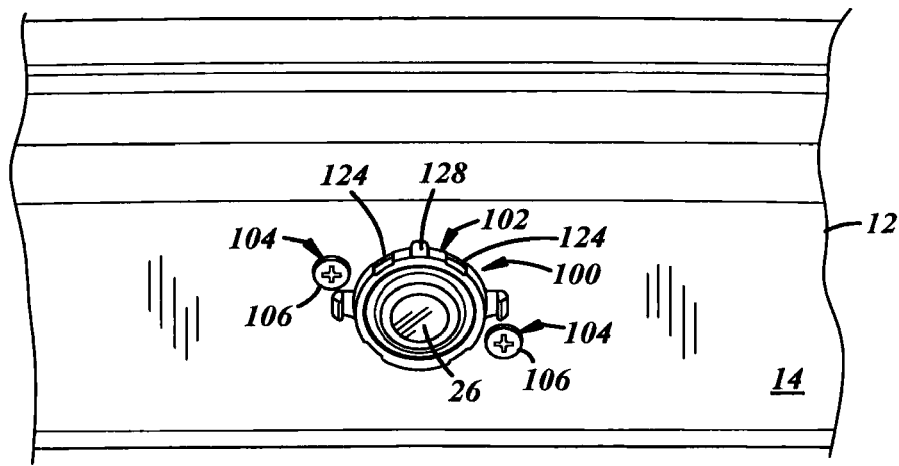
FIG. 12 is a fragmentary front view of a portion of an exterior surface of a vehicle deck lid including a rear-facing camera assembly.

To retain the camera assembly 10 in position relative to the panel 12, a retaining clip 58 may be provided that couples to the camera housing 42 and bears on the inner surface 18 of the panel 12. The clip 58 may include a slot 60 open at one end and closed at the other. The slot 58 defines two spaced apart fingers 62 and may include one or more alignment features and/or be shaped to permit only one orientation of the clip 58 relative to the bezel 24 and/or camera housing 42 to ensure proper installation when assembled onto a vehicle. In the implementation shown in FIGS. 10 and 11, the clip 58 includes a smaller slot 66 at its second end 68 that is adapted to receive a mounting tab 30 of the bezel 24. When the mounting tabs 30 of the bezel 24 are offset from each other (i.e. not diametrically opposed), only one mounting tab 30 can be received within the smaller slot 66 when the clip 58 is in its fully assembled position to ensure a desired orientation of the clip in assembly.

The clip 58 may include one or more retention features in or adjacent to the slot 60 to engage one or both of the camera housing 42 and the bezel 24, and thereby facilitate retention of the clip 58 relative to the camera and bezel. In the implementation shown, the retention features include a pair of projections 70 which may be opposed nubs that extend into the slot 60 providing a reduced width or effective area of the slot 60 in the area of the projections 70. In at least some forms, the largest gap between the projections 70 is less than the outer diameter of the neck 44 of the camera housing 42 that is received within the slot 60. And the projections 70 may be spaced from a rear end of the slot 60 (which does not include smaller slot 66 in this implementation and is a portion of the slot 60 too small for the neck to pass through and need not be the endmost area of the slot) a distance greater than a radius of the neck 44 where the radius extends from an axis 71 (FIG. 9) of neck 44 to the outer surface of the neck. In this way, the camera housing 42 can be received within the slot 60 beyond a centerline or axis of the neck 44, as will be described in more detail later.

One or more walls 72 may surround at least a portion of the slot 60 and may extend from a generally planar first surface 74 of the clip 58. Biasing members 76 may be provided extending from an opposite, second surface 78 of the clip 58. The biasing members 76 may be arranged to engage the panel 12 in assembly and are generally flexible and resilient to urge the rest of the clip 58 away from the panel 12. In the implementation shown, the biasing members 76 include resilient and flexible cantilevered fingers. An angled grip 80 may be provided to facilitate manual manipulation of the clip 58. The clip 58 may be molded from plastic and the biasing members 76 may be integrally formed from the same piece of material as the remainder of the clip such that all features of the clip are simply different portions of the same component. Of course, other biasing members 76 could be used and the clip need not be defined by a single piece of material.

Figure 4:
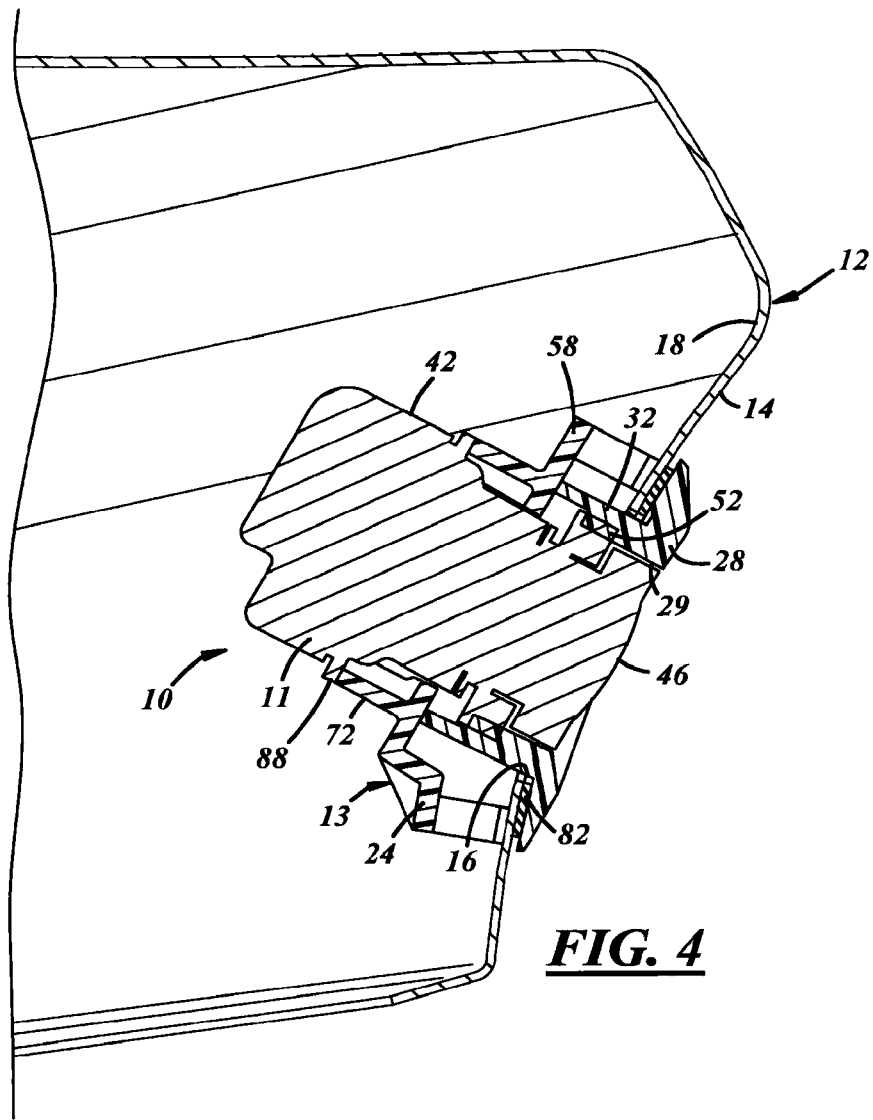
FIG. 4 is a cross-sectional view taken generally along line 4-4 of FIG. 3.
Figure 8:
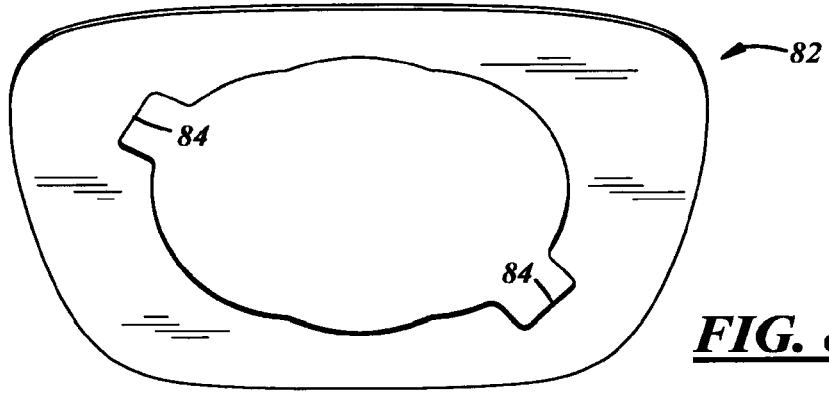
FIG. 8 is a front perspective view of a gasket of the camera assembly.

In assembly, a gasket 82 such as is shown in FIGS. 4, 5 and 8 may be placed around the opening 16 in the panel 12 to provide a seal between the bezel 24 and panel 12. The gasket 82 may be hidden beneath the bezel 24 for improved appearance, and the gasket may include alignment slots 84 complementary to those in the opening 16 to facilitate proper orientation of the gasket in use. The gasket 80 may be simply adhered to the panel 12 or bezel 24 prior to installation of the bezel 24, clip 58 and camera 11 to the panel 12, if desired.

To install the camera assembly 10 on the panel 12, the bezel 24 is positioned with its wall 32 extending through the opening 16 and its outer plate 28 bearing on the gasket 82 and/or the outer surface 14 of the panel 12. The alignment tabs 31 on the bezel 24 fit through the recesses 20 of the opening 16 and slots 84 in gasket 82 in only one orientation to ensure proper orientation of the bezel 24 relative to the panel 12. The neck 44 of the camera housing 42 is then inserted into the cavity 36 of the bezel 24 from the opposite direction that the bezel 24 is inserted into the panel opening 16. That is, the bezel 24 is inserted from the outside of the panel 12 and the camera 11 is inserted into the cavity 36 from the inside of the panel 12. Screws 40 or other fasteners connect the camera housing 42 to the bezel 24 via the aligned mounting tabs 30, 54. This securely connects the camera housing 42 to the bezel 24 in a subassembly.

To retain the bezel 24 and camera housing 42 subassembly in position relative to the panel 12, the clip 58 is installed between the subassembly and the inner surface 18 of the panel 12. To do this, the slot 60 of the clip 58 is aligned with the neck 44 of the camera housing 42 and the clip 58 is slidably advanced until the projections 70 engage the neck 44 and are snapped around the neck 44. To provide a more secure, "over center" connection, an axis 71 of the neck 44 may be advanced past the projections 70. As the projections 70 pass over the axis 71 of the neck 44, the clip fingers 62 are outwardly flexed to accommodate the neck 44 past the projections 70, and then the resilient fingers 62 return toward their unflexed positions. In this position, the outer surface of the neck 44 may engage the clip 58 at the rear end 85 of the slot 60 on one side of its axis 71 and at the projections 70 on the opposite side of its axis 71 to firmly hold the clip 58 in place on the neck 44. The distance between the projections 70 relative to the outer diameter of the neck 44, and the stiffness of the fingers 62 can be calibrated to require a certain force to remove the clip 58 from the neck 44, which requires passing the projections 70 over the neck 44 in the opposite direction than the direction in which the clip was assembled onto the neck.

With the clip 58 assembled on to the neck 44 of the camera housing 42, the clip wall(s) 72 engage the camera housing 42, such as along an outwardly extending shoulder 88 of the housing as best shown in FIG. 4. Further, the biasing members 76 are preferably engaged and flexed against the inner surface 18 of the panel 12. This urges the camera and bezel subassembly in a direction away from the inner surface 18 of the panel 12. By its connection to the camera housing 42, the bezel 24 is pulled tightly against the gasket 82 and/or outer surface 14 of the panel 12. This helps to maintain a generally flush engagement of the bezel outer plate 28 with or near the outer surface 14 of the panel 12 and securely maintains the position of the camera 11 relative to the bezel 24 and panel 12. Hence, the clip 58 and bezel 24 provide a secure and opposed engagement with the inner and outer surfaces 18, 14, respectively, of the panel 12.

The installation of the camera assembly 10 as described above can be achieved without any fasteners extending through the panel 12. The connection provided also prevents the bezel 24 from being withdrawn from the panel opening 16 which could provide access to the camera housing 42 and potentially theft or unintended removal of the camera 11. Indeed, the bezel 24 could be designed so that attempts to pry the outer plate 28 away from the panel 12 would result in a portion of the outer plate 28 breaking away from the bezel 24. Indeed, in the example shown, with the clip 58 installed behind the panel, the camera 11 cannot be pulled through the panel opening 16 even if the entire outer plate 28 were broken away from the rest of the bezel 24. If that were to happen, the camera housing 42 would fall away from the inner panel surface 18 and would not be easily removed through the panel opening 16. In the example where the panel 12 is a trunk lid, the camera 11 would simply fall into or inward of the trunk and would not be easily accessed by a would-be thief. This would discourage or prevent theft of the camera.

When access to the inner surface 18 of the panel 12 is provided, the camera assembly 10 can be easily disconnected from the panel 12 such as for repair or replacement of the camera assembly. To do this, the clip 58 can be slidably displaced from between the camera housing 42 and panel 12 and the mounting screws 40 can be removed from the camera housing and bezel tabs 30, 54 to separate the camera from the bezel. Thereafter, the assembly can easily be reinstalled on the panel, as desired.

A second implementation of a camera assembly 100 is shown in FIGS. 12-20. Many components may be the same as or similar to components set forth above, and to that extent, may be given the same reference number for ease of description. In this implementation, the camera assembly 100 is mounted to a clip 102 that is installed on the inner surface 18 of the panel 12. Fasteners 104, such as screws, may extend through the panel 12 so that enlarged heads 106 of the fasteners 104 are against the outer surface 14 of the panel 12 while threaded shanks extend through corresponding openings 110 (FIG. 13) in the panel 12 and into complementary bores 112 in the clip 102.

Figure 13:
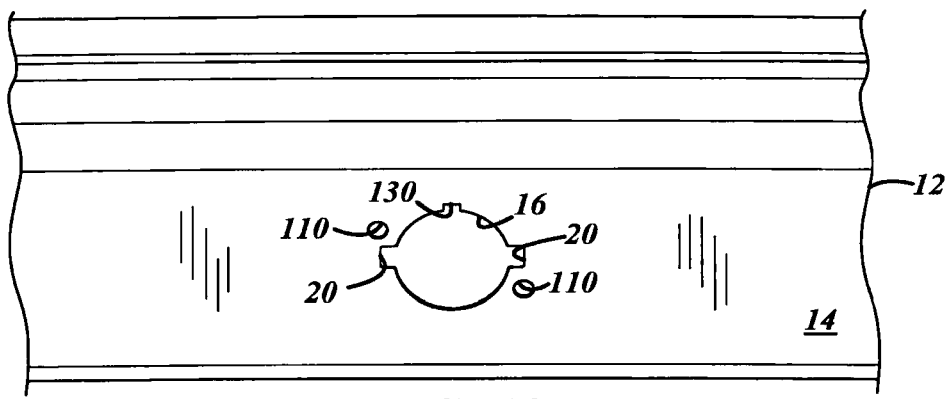
FIG. 13 is a fragmentary view like FIG. 12 with the camera assembly removed from the deck lid.
Figure 14:
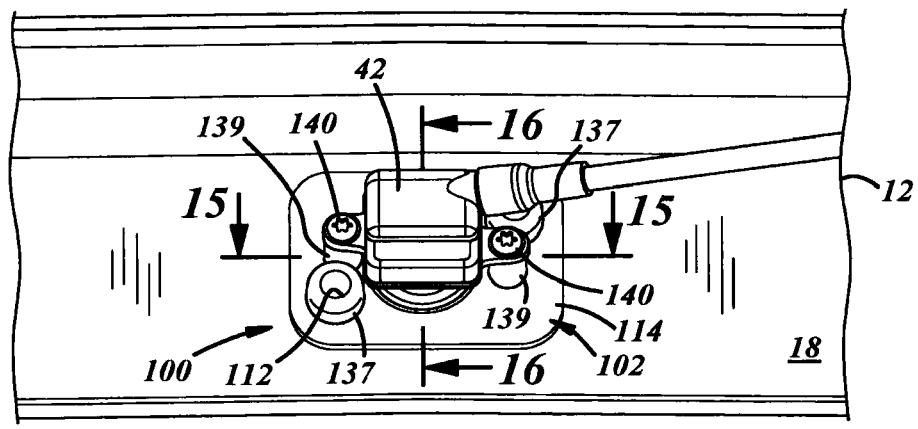
FIG. 14 is a fragmentary perspective view of an inside surface of the deck lid with the camera assembly of FIG. 12 installed on the deck lid.
Figure 15:
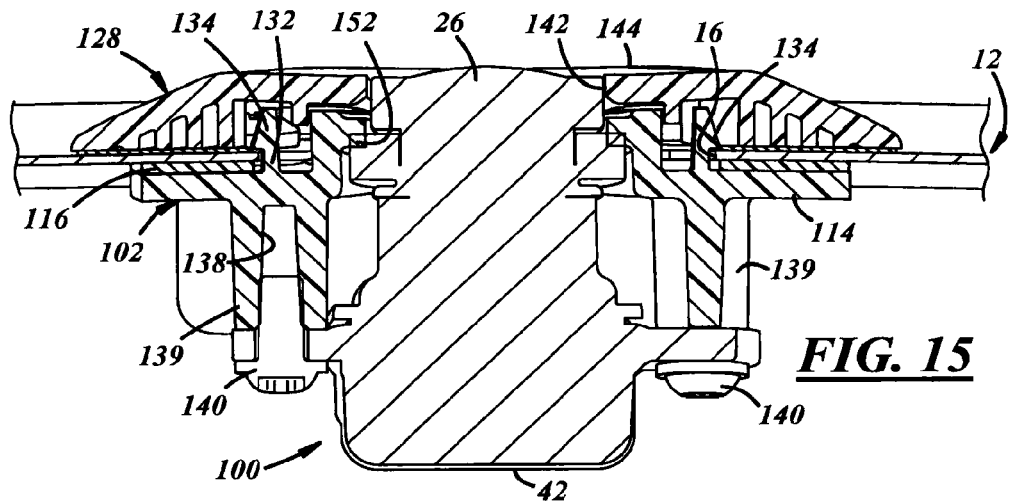
FIG. 15 is a cross-sectional view taken generally along line 15-15 of FIG. 14.
Figure 16:
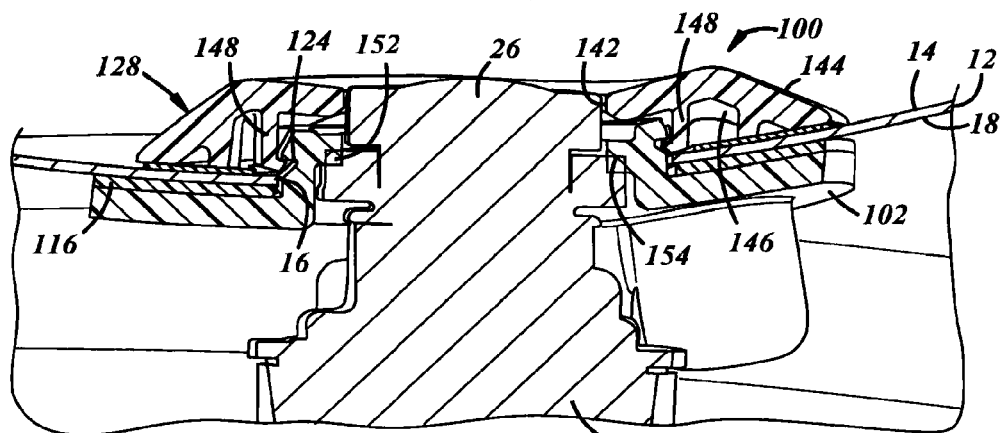
FIG. 16 is a cross-sectional view taken generally along line 16-16 of FIG. 14.

In more detail, the clip 102 may have an outwardly extending plate 114 adapted to be received adjacent to the inner surface 18 of the panel 12, with or without a gasket 116 or other seal disposed between them. The plate 114 is larger than the main opening 16 through the panel 12 so that the clip 102 cannot be pulled or otherwise fitted through the opening 16. The clip 102 may include a camera mounting portion 118 that may include a generally cylindrical wall 120 that extends axially into or through the opening 16 and includes an opening 122 in or through which the camera lens 26 may be received. The clip 102 may also include one or more bezel retention features either formed as part of the camera mounting portion 118 or separate therefrom. In the implementation shown, the bezel retention features include one or more slots or cavities 124 (FIGS. 16 and 19) formed in the periphery of wall 120 and arranged to be accessible from outside of panel 12. To ensure proper orientation of the clip 102 relative to the panel 12, the clip 102 may include an alignment feature or key 128 adapted to be received within a complementary feature (e.g. slot/recess 130) formed in the panel 12, as shown in FIG. 13. The clip 102 may also include panel retention features that releasably engage the panel 12 to hold the clip 102 in position relative to the panel during installation. These features may include flexible resilient fingers 132 with catches 134 (FIGS. 15 and 19) that snap-fit against the panel 12 as the fingers 132 are passed through recesses 20 or other openings in the panel 12, as best shown in FIG. 15. Finally, the clip 102 may include one or more openings 110 to receive the fasteners 104 connecting the clip 102 to the panel 12. The openings 110 may be defined at least in part in cylindrical walls 137 extending from the plate 114. Separate openings 138, which may also be defined within cylindrical walls 139 may be provided to receive fasteners 140 connecting the camera housing 42 to the clip 102.

Figure 17:
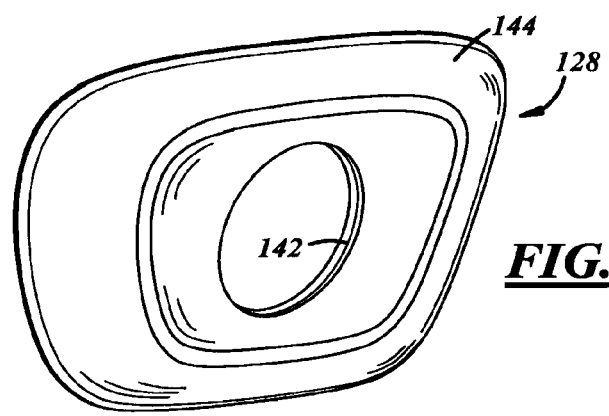
FIG. 17 is a front perspective view of a bezel of the camera assembly.
Figure 18:
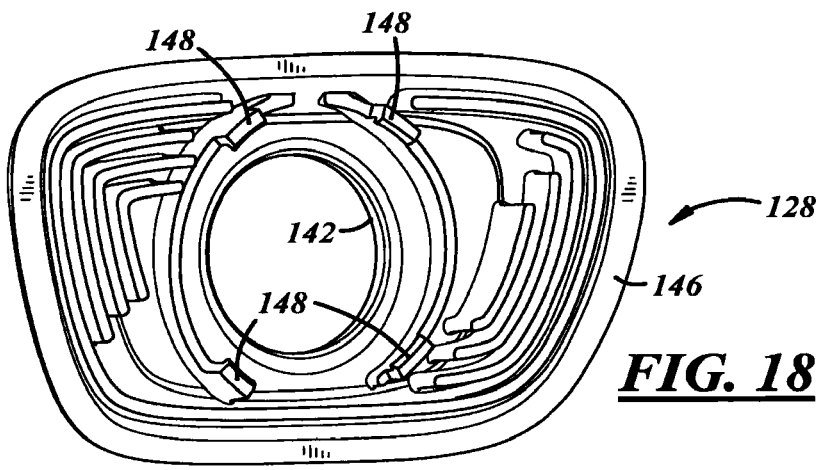
FIG. 18 is a rear perspective view of the bezel.
Figure 19:
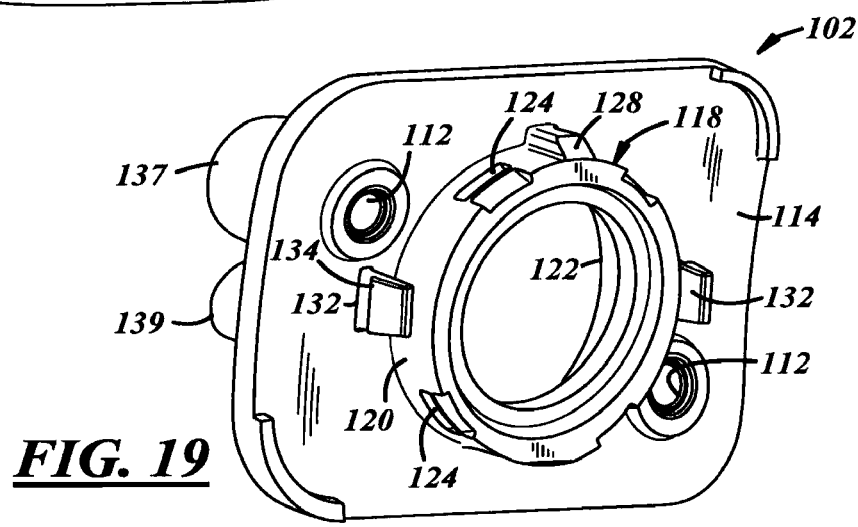
FIG. 19 is a front perspective view of a mounting bracket for the camera assembly.
Figure 20:
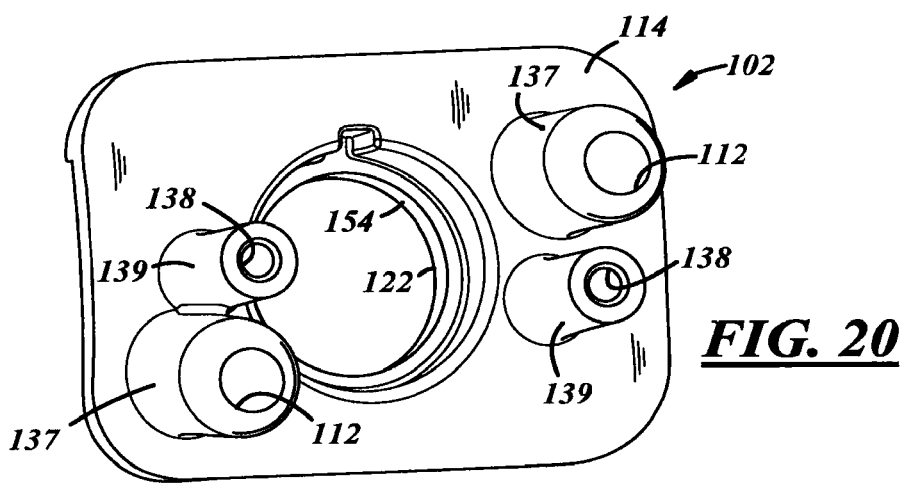
FIG. 20 is a rear perspective view of the mounting bracket.

As best shown in FIGS. 17 and 18, the bezel 128 may have an opening 142 for the camera lens 26 which extends from an outer, decorative surface 144 to an inner surface 146 adapted to overlie the outer surface 14 of the panel 12. The bezel 128 may contain one or more alignment features that mate with complementary features on one or both of the panel 12 and the clip 102 to ensure proper orientation of the bezel. To connect the bezel 128 to the panel 12, the bezel 128 may include radially extending tabs 148 that snap-fit into associated cavities 124 on the clip 102.

In assembly, the clip 102 is inserted against the inner surface 18 of the panel 12 with panel retention fingers 132 of the clip 102 snap fit against the outer surface 14 of the panel 12 and the alignment feature 128 on the clip 102 received within the corresponding recess 130 of the panel 12. Fasteners 104 may then be inserted through the openings 110 of the panel 12 which are aligned with the openings 112 in the clip 102. When tightened, the plate 114 of the clip 102 is securely held against the inner surface 18 of the panel 12 and the camera mounting portion 118 of the clip 102 is aligned with and/or received in the panel opening 16.

Thereafter, the camera housing 42 can be aligned with the clip 102 from an inner surface 18 of the panel 12, with a portion of the camera neck 44 received within the camera mounting portion 118 of the clip 102. Fasteners 140 can then be inserted through the mounting tabs 54 of the camera housing 42 and into corresponding openings 138 in the clip 102 to firmly attach the camera 11 to the clip 102. Like the previous embodiment, a seal 152 (FIGS. 15 and 16) may be provided between the neck portion 44 of the camera housing 42 and an inwardly extending shoulder 154 provided on the clip 102. The tabs 148 of the bezel 128 may then be snap fit into the cavities 124 in the clip 102 from the opposite side of the panel 12 to firmly connect the bezel 128 and clip 102. So assembled, the bezel 128 overlies the outer surface 14 of the panel 12 and covers the clip 102 and openings 110 so that they are not visible from the exterior of the panel 12.

Even if the bezel 128 is removed from the clip 102 and panel 12, the camera 11 cannot easily be removed from the vehicle, at least when the camera is connected to the clip within a compartment of the vehicle (e.g. within the trunk) that is not accessible from outside the vehicle. This is because the clip 102 can be sized so that it does not fit through the opening 16, and the camera housing 42 is securely connected to the clip 102 from within the panel 12. That is, the connection between the camera housing 42 and the clip 102 is not accessible from outside the panel 12. Removing the fasteners 104 holding the clip 102 to the panel 12 will tend to cause the camera and clip subassembly to fall away from the opening 16 (e.g. further into the trunk) thereby frustrating attempted theft of the camera 11. However, intentional removal of the camera assembly, such as for repair or replacement can be easily accomplished with access to the interior of the panel 12 (e.g. opening the trunk).

The above described embodiments are but a couple examples of camera assemblies 10, 100 that may be adapted for use with a vehicle panel 12, as noted herein. The panel may be formed from sheet metal and need not be a plastic panel or fascia of the vehicle. Further, other than one or more openings for the camera assembly 10, 100, the panel 12 need not have any alterations or specially formed features such as cavities, walls or the like to position and retain the camera assembly. For example, in the embodiments shown, the inner and outer surfaces 18, 14 of the panel 12 that surround opening 16 and are engageable by the camera mounting assembly are generally smooth and flat without outwardly extending features such as walls, fingers or the like, or inwardly extending features like pockets, cavities or the like, to engage or retain the camera assembly 10, 100. This greatly reduces the complexity of the vehicle panel 12 to which the camera assembly 10, 100 is mounted and facilitates mounting different camera assemblies to vehicle panels. Further, the camera assemblies can be securely fastened adjacent to an interior of a vehicle panel in such a way as to deter or prevent theft of the camera, while permitting relatively easy access to the camera for repair or replacement.

What is claimed is:

1. A mounting assembly for a vehicle camera to mount the camera to a vehicle panel having inner and outer surfaces and an opening, comprising:
   a clip adapted to overlie an inner surface of the panel and having a camera retention feature for connecting the clip to the camera, the clip being larger than the opening in the panel to inhibit the camera from being removed through the opening; and
   a bezel adapted to overlie the outer surface of the panel and having a connection feature adapted to connect the bezel with one or both of the clip and the camera to trap a portion of the vehicle panel between the bezel and the clip, wherein the clip engages the bezel, the clip is formed from one-piece of material and the clip is trapped between the camera and the panel.

2. The mounting assembly of claim 1 wherein the bezel extends through the opening and includes a mounting feature for connection to the camera.

3. The mounting assembly of claim 1 wherein the bezel is connected to the camera and the clip slidably couples with the camera and engages an inner surface of the panel to releasably retain the camera and bezel in position relative to the panel.

4. The mounting assembly of claim 3 wherein the clip includes at least one biasing member that yieldably biases the camera away from the panel and the bezel against the outer surface of the panel.

5. The mounting assembly of claim 4 wherein said at least one biasing member includes a plurality of flexible fingers carried by the clip that each engage the inner surface of the panel when the clip is installed, with at least one finger engaging the panel adjacent to each of a pair of opposed sides of the opening.

6. The mounting assembly of claim 5 wherein each finger is of the same length and adapted to engage a generally planar section of the panel in which the opening is formed.

7. The mounting assembly of claim 1 wherein the bezel and clip are maintained adjacent opposite sides of the panel without any mechanical fasteners extending through the panel.

8. The mounting assembly of claim 1 wherein the clip is coupled to the panel by at least one fastener that extends through the panel.

9. The mounting assembly of claim 1 wherein the panel is a flat panel made of metal and the clip is located adjacent to the inner surface of the panel and the bezel is located adjacent to the outer surface of the panel.

10. The mounting assembly of claim 1 wherein a first seal is provided between the camera and the bezel and a second seal is provided between the bezel and the panel.

11. A mounting assembly for a vehicle camera to mount the camera to a vehicle panel having inner and outer surfaces and an opening, comprising:
   a bezel having an outer plate adapted to overlie the outer surface of the panel, an opening through the bezel aligned with the opening of the panel and a connection feature; and
a clip having a plate adapted to overlie an inner surface of the panel with an opening in the plate aligned with the opening in the vehicle panel, the clip having a camera retention feature for connecting the clip to the camera, the clip being engaged on one side with the camera and on its other side with the panel, the connection feature being connected to one or both of the clip and the camera, and wherein a portion of the panel is both overlied by and trapped between both the plate of the clip and the outer plate and the a portion of the camera extends through the opening in the plate of the clip, wherein the clip includes at least one biasing member integrally formed in one piece with the remainder of the clip and that yieldably biases the camera away from the panel and the bezel against the outer surface of the panel.

12. The mounting assembly of claim 11 wherein the clip is releasably connected to the camera so that the clip may be removed from the camera.

13. The mounting assembly of claim 11 wherein the bezel and clip are maintained adjacent opposite sides of the panel without any mechanical fasteners extending through the panel.

14. A mounting assembly for a vehicle camera to mount the camera to a vehicle panel having inner and outer surfaces and an opening, comprising:
   a bezel having an outer plate adapted to overlie the outer surface of the panel, an opening through the bezel aligned with the opening of the panel and a connection feature adapted to extend from the outer plate through the panel opening to connect with the camera, where the connection between the camera and the bezel is on the opposite side of the panel as the outer plate; and
   a clip adapted to overlie an inner surface of the panel and having a camera retention feature for connecting the clip to the camera, the clip being engaged on one side with the camera and on its other side with the panel, wherein the clip includes a slot defining a pair of fingers between which a portion of the camera is received, and the clip also includes a camera retention feature that snap-fits with a portion of the camera to maintain the position of the clip and camera in assembly.

15. The mounting assembly of claim 14 wherein the camera retention feature includes at least one projection into the slot providing a reduced width of the slot in the area of the projection.

16. The mounting assembly of claim 11 which also comprises an annular seal to provide a seal around a portion of the camera and wherein the clip includes an annular shoulder that engages the seal to provide a seal between the clip and the camera.

17. A mounting assembly for a vehicle camera to mount the camera to a vehicle panel having inner and outer surfaces and an opening, comprising:
   a bezel having an outer plate adapted to overlie the outer surface of the panel, an opening through the bezel aligned with the opening of the panel and a connection feature; and
   a clip having a plate adapted to overlie an inner surface of the panel with an opening in the plate aligned with the opening in the vehicle panel, the clip having a camera retention feature for connecting the clip to the camera, the clip being engaged on one side with the camera and on its other side with the panel, the connection feature being connected to one or both of the clip and the camera, and wherein a portion of the panel is both overlied by and trapped between both the plate of the clip and the outer plate and the a portion of the camera extends through the opening in the plate of the clip, wherein the clip is directly connected to the panel independently of the bezel and the bezel is connected by snap-fit to the clip.

18. The mounting assembly of claim 17 wherein the clip is connected by one or more fasteners to the panel and the camera is connected by one or more fasteners to the clip.

* * * * *